(12) United States Patent
Lin (10) Patent No.: US 8,896,557 B2
(45) Date of Patent: Nov. 25, 2014

(54) TOUCH PAD (76) Inventor: Chih-Chung Lin, Taipei (TW)

(*) Notice: Subject to any disclaimer, the term of this patent is extended or adjusted under 35 U.S.C. 154(b) by 313 days.

(21) Appl. No.: 13/605,415

(22) Filed: Sep. 6, 2012

(65) Prior Publication Data
US 2014/0028580 A1 Jan. 30, 2014

(30) Foreign Application Priority Data

Jul. 26, 2012 (TW) .............................. 101126893 A (51) Int. Cl.
G06F 3/041 (2006.01)
(52) U.S. Cl.
USPC .......................................................... 345/173
(58) Field of Classification Search
None
See application file for complete search history.

(56) References Cited

U.S. PATENT DOCUMENTS

2010/0220075 A1* 9/2010 Kuo et al. ..................... 345/174

* cited by examiner

Primary Examiner — Nicholas Lee
(74) Attorney, Agent, or Firm — Jackson IPG PLLC (57) ABSTRACT A touch pad includes a first transparent substrate and a second transparent substrate. The first transparent substrate has a plurality of first axial electrodes and at least one hollow channel. The second transparent substrate has a plurality of second axial electrodes. Each of the second axial electrodes has a plurality of first sensing electrode regions and at least one second sensing electrode region. The first sensing electrode regions are provided on both sides of the second sensing electrode region and arranged to extend along a second direction. The central portion of the second sensing electrode regions is formed with a hollow region. By means of the first axial electrode and the second axial electrode, the touch pad of the present invention has an increased signal-to-noise ratio and an enhanced anti-jamming capability.

8 Claims, 7 Drawing Sheets

TOUCH PAD

This application claims the priority benefit of Taiwan patent application number 101126893 filed on Jul. 26, 2012.

BACKGROUND OF THE INVENTION

1. Field of the Invention

The present invention relates to a touch pad, and in particular to a touch pad capable of increasing signal-to-noise ratio to thereby enhance its anti-jamming capability and applicability.

2. Description of Prior Art

With the rapid advancement of information technology and communication network, electronic products have been widely used in our daily life. Thus, touch pads are also developed in order to enhance the functions and utility of the electronic products. Existing touch pads are primarily divided into four categories including: resistance-type, capacitance-type, electromagnetic-type and optical-type based on their principles of sensing signals. The capacitance-type touch pad (referred to "capacitive touch pad" hereinafter) is dust-proof, fire-resistant and high-definition, so that it is widely used. The operating principle of the capacitive touch pad is described as follows. The capacitive touch pad is configured to identify the position of contact based on a change of capacitance. More specifically, the capacitive touch pad is configured to identity the coordinates of a contact point based on a change of capacitance between electrodes caused by the approach of an object (such as a finger or other conductor).

The capacitive touch pad has become a mainstream in the touch control technology and is widely used in various electronic products, such as mobile phone, panel computer, walkman, handheld electronic device (apparatus), various displayers, monitor and etc. When a finger of a user touches the capacitive touch pad provided on the aforesaid electronic product, a change of capacitance between two positions of the finger can be detected, thereby achieving a touch control effect.

Generally speaking, the capacitive touch pad is configured as a two-layer touch pad. For both layers of the touch pad, an Indium Tin Oxide (ITO) layer is formed on each transparent electrical conductive substrate by a plurality of screen printing processes or lithography processes. According to the conventional technique for the touch pad, the sensing electrode used in the touch pad is designed as a rhombus shape, and a connecting line is used to serially connect the sensing electrodes in the same axial direction. However, when used in the touch pad, the rhombus-shaped sensing electrode has a limited area covering the transparent electrical conductive substrate. As a result, the touch pad has a low signal-to-noise ratio and a poor anti-jamming capability. Thus, the prior art has the following problems including: (I) low signal-to-noise ratio; and (II) poor anti-jamming capability.

Therefore, it becomes an important issue for the present Inventor and the manufacturers in this art to solve the problems of prior art.

SUMMARY OF THE INVENTION

In order to solve the above problems, an objective of the present invention is to provide a touch pad having an increased signal-to-noise ratio to thereby enhance the anti-jamming capability.

Another objective of the present invention is to provide a touch pad having an increase applicability.

In order to achieve the above objective, the present invention is to provide a touch pad including a first transparent substrate and a second transparent substrate. The first transparent substrate has a plurality of first axial electrodes formed by extending along a first direction. At least one hollow channel is formed between adjacent two of the first axial electrodes. The second transparent substrate is provided on one side of the first transparent substrate. The second transparent substrate has a plurality of second axial electrodes. Each of the second axial electrode has a plurality of first sensing electrode regions and at least one second sensing electrode region. The first sensing electrode regions are provided on both sides of the second sensing electrode region. At least one first directional channel is formed between adjacent two of the first sensing electrode regions, and the first directional channel is oriented to extend along a second direction. A central portion of the second sensing electrode regions is formed with a hollow region. At least one second directional channel is formed between the hollow region and the first sensing electrode regions. By means of the first axial electrode and the second axial electrode, the touch pad of the present invention has an increased signal-to-noise ratio and an enhanced anti-jamming capability.

DETAILED DESCRIPTION OF THE INVENTION

Figure 1A:
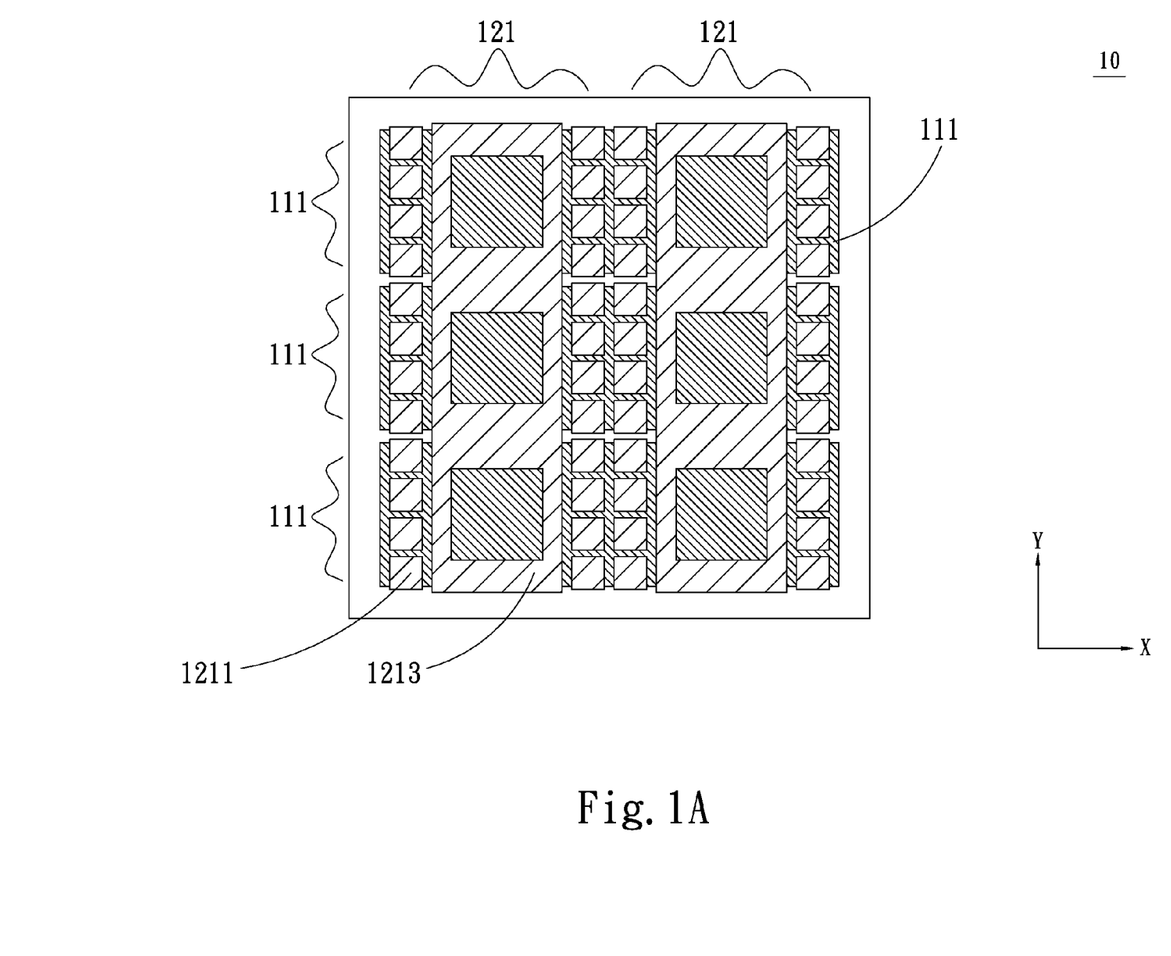
FIG. 1A is an assembled plan view showing a first embodiment of the present invention.
Figure 1B:
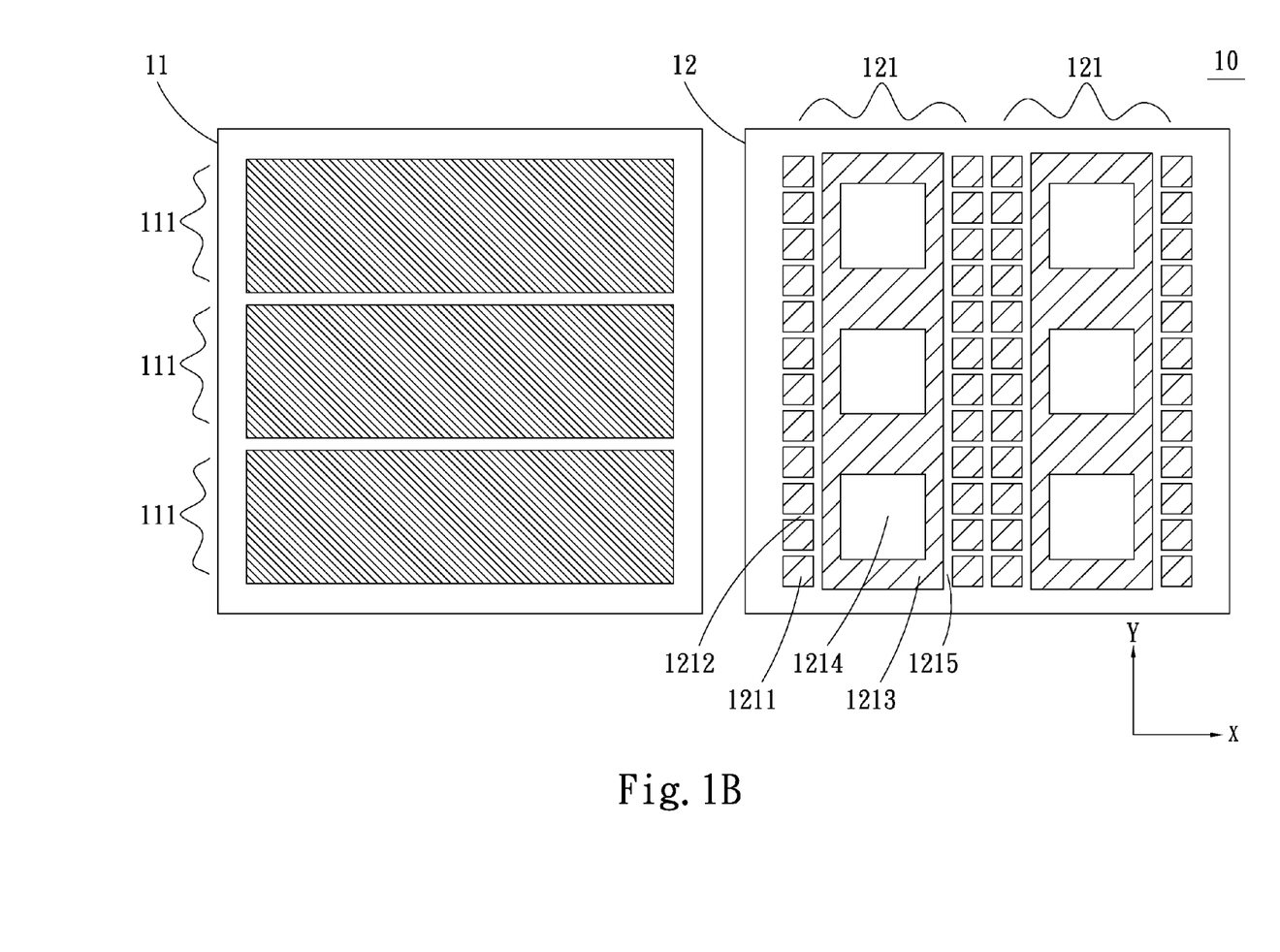
FIG. 1B is an exploded plan view showing the first embodiment of the present invention.
Figure 1C:
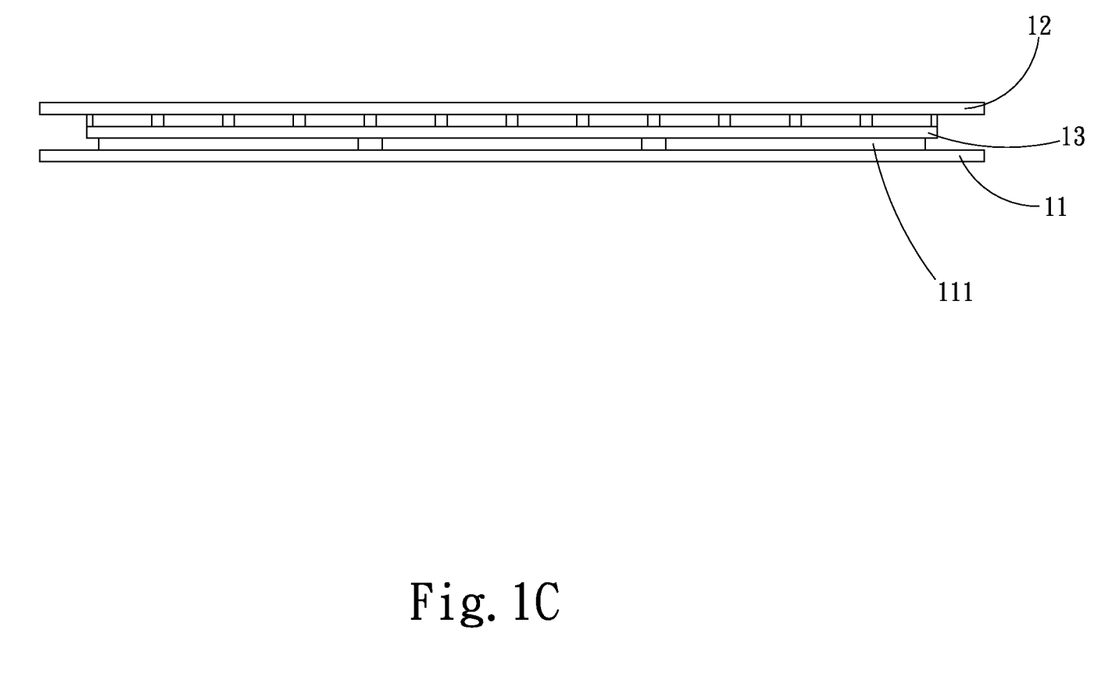
FIG. 1C is a cross-sectional view showing the first embodiment of the present invention.

The above objectives and structural and functional features of the present invention will be described in more detail with reference to preferred embodiment thereof shown in the accompanying drawings The present invention is directed to a touch pad. FIG. 1A is an assembled plan view showing a first embodiment of the present invention. FIG. 1B is an exploded plan view showing the first embodiment of the present invention. FIG. 1C is a cross-sectional view showing the first embodiment of the present invention. The touch pad 10 includes a first transparent substrate 11 and a second transparent substrate 12. In the present embodiment, the first transparent substrate 11 and the second transparent substrate 12 are made of glass, but they are not limited thereto. The first transparent substrate 11 and the second transparent substrate 12 may be made of any one of polyethylene terephthalate (PET), poly carbonate (PC), polyethylene (PE), poly vinylchloride (PVC), poly propylene (PP), poly styrene (PS), polymethylmethacrylate (PMMA) and cyclo olefin copolymer (COC).

The first transparent substrate 11 has a plurality of first axial electrodes 111. The second transparent substrate 12 is provided on one side of the first transparent substrate 11. The second transparent substrate 12 has a plurality of second axial electrodes 121. The first axial electrodes 111 and the second axial electrodes 121 may be made of a film of Indium Tin Oxide (ITO), Antimony Tin Oxide (ATO), or Indium Zinc oxide (IZO). In the present embodiment, the first axial electrode 111 and the second axial electrode 121 are formed on one side surface of the first transparent substrate 11 and the second transparent substrate 12 by a sputtering process, but it is not limited thereto. In practice, the first axial electrode 111 and the second axial electrode 121 are formed on the side surface of the first transparent substrate 11 and the second transparent substrate 12 by a glue spin-coating process, an electroplating process, or a vapor deposition process.

The first axial electrodes 111 are formed by extending along a first direction X. In the present embodiment, the first direction X is embodied as the X axis. At least one hollow channel 112 is formed between adjacent two of the first axial electrodes 111. Thus, the first axial electrodes 111 are formed on the first transparent substrate 11. Except for the hollow channel 112, the remaining portions of the first transparent substrate 11 are arranged with the first axial electrodes 111.

The second transparent substrate 12 is provided on one side of the first transparent substrate 11. The second transparent substrate 12 has a plurality of second axial electrodes 121. Each of the second axial electrodes 121 comprises a plurality of first sensing electrode regions 1211 and at least one second sensing electrode region 1213. The first sensing electrode regions 1211 are provided on both sides of the second sensing electrode region 1213. At least one first directional channel 1212 is formed between adjacent two of the first sensing electrode regions 1211, and the first directional channel 1212 is oriented to extend along a second direction Y. A central portion of the second sensing electrode regions 1213 is formed with a hollow region 1214. At least one second directional channel 1215 is formed between the hollow region 1214 and the first sensing electrode regions 1211. In the present embodiment, the second sensing electrode region 1213 is formed with three hollow regions 1214 by extending along the second direction Y. The second directional channel 1215 completely penetrates the first sensing electrode region 1211 and the second sensing electrode region 1213.

Please also refer to FIG. 1C. The touch pad 10 further has an insulation layer 13. The insulation layer 13 is provided between the first transparent substrate 11 and the second transparent substrate 12 to cover the first axial electrode 111 and the second axial electrode 121. When the first transparent substrate 11, the insulation layer 13, and the second transparent substrate 12 are stacked up, the hollow channel 112 of the first axial electrode 111 is disposed at the position of the first directional channel 1212. By means of the first axial electrode 111 and the second axial electrode 121, the touch pad of the present invention has an increased signal-to-noise ratio and an enhanced anti-jamming capability. Even though a user puts on a glove, the touch pad of the present invention can still correctly recognize the touch signals to thereby increase its applicability. Further, each of the first axial electrode 111 and the second axial electrode 121 further has at least one connecting line (not shown) for electrically connecting the first axial electrode 111 to the first sensing electrode region 1211 and the second sensing electrode region 1213.

Figure 2A:
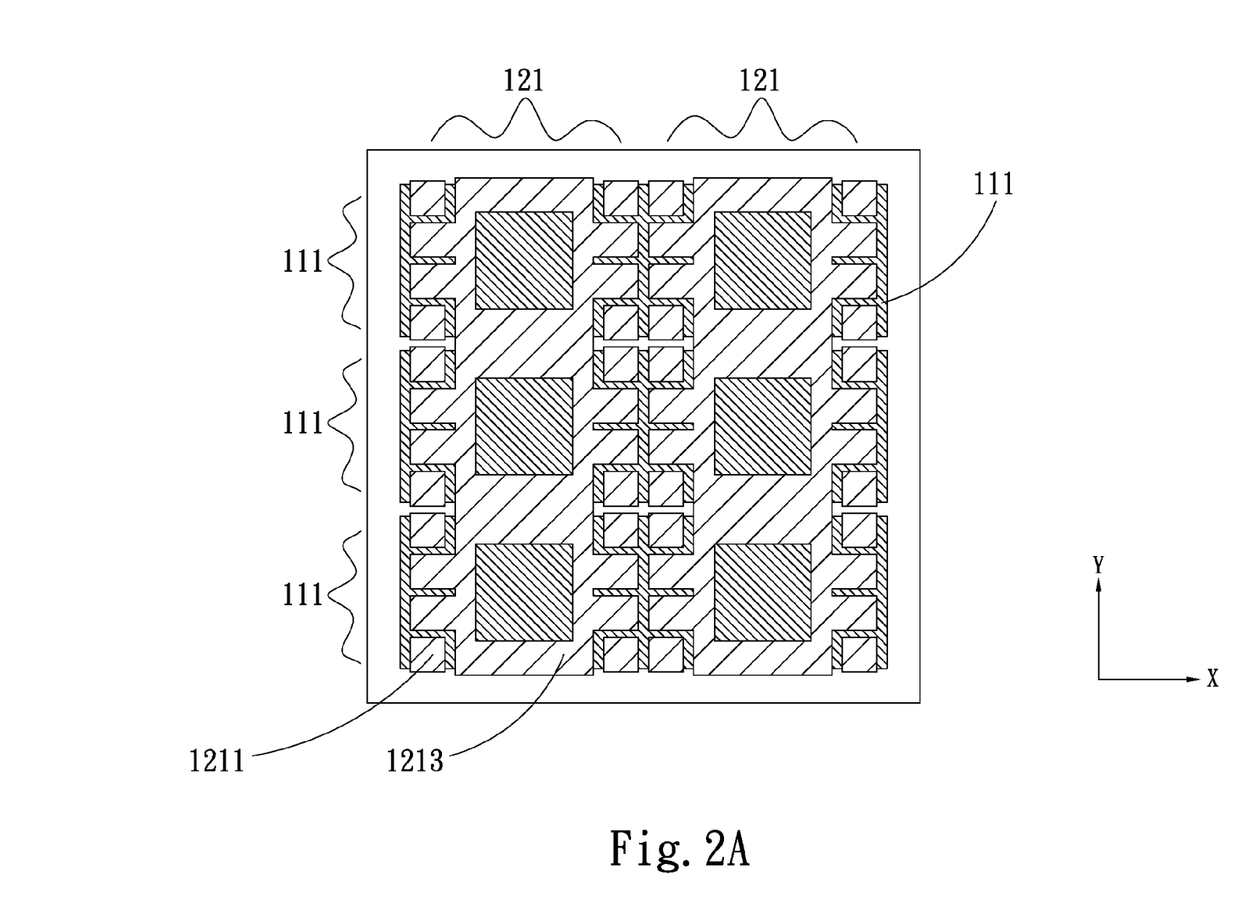
FIG. 2A is an assembled plan view showing a second embodiment of the present invention.
Figure 2B:
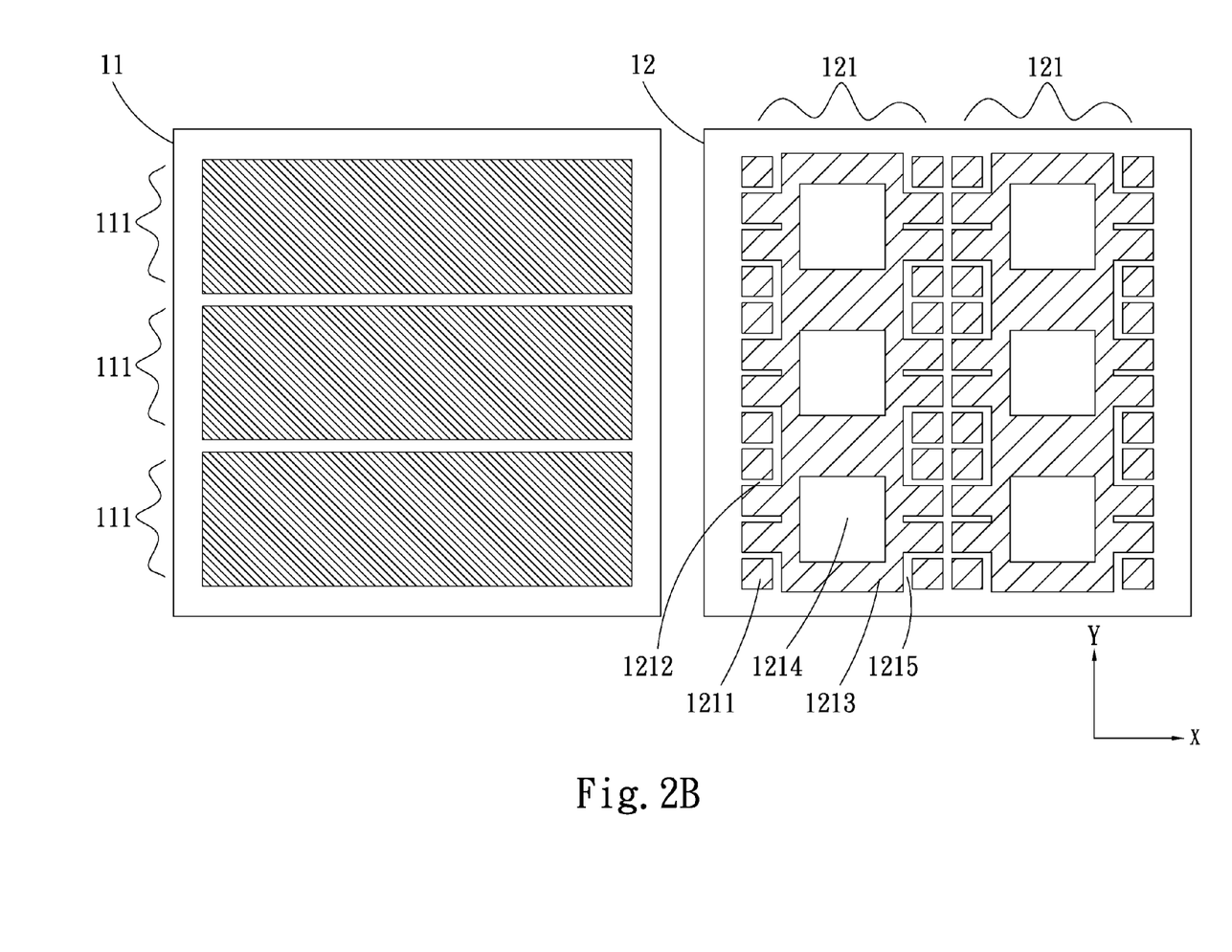
FIG. 2B is an exploded plan view showing the second embodiment of the present invention.

Please refer to FIG. 2A and FIG. 2B. FIG. 2A is an assembled plan view showing a second embodiment of the present invention, and FIG. 2B is an exploded plan view showing the second embodiment of the present invention. As shown in these figures, the structure of the second embodiment is substantially the same as that of the first embodiment, so that the redundant description is omitted for simplicity. The difference between the second embodiment and the first embodiment lies in that a portion of the first sensing electrode regions 1211 of the second transparent substrate 12 is connected to the second sensing electrode region 1213. In the second embodiment, two of the first sensing electrode regions 1211 in the central portion are connected to the second sensing electrode region 1213. Thus, by means of the first axial electrode 111 and the second axial electrode 121, the touch pad of the present invention has an increased signal-to-noise ratio and an enhanced anti-jamming capability.

Figure 3A:
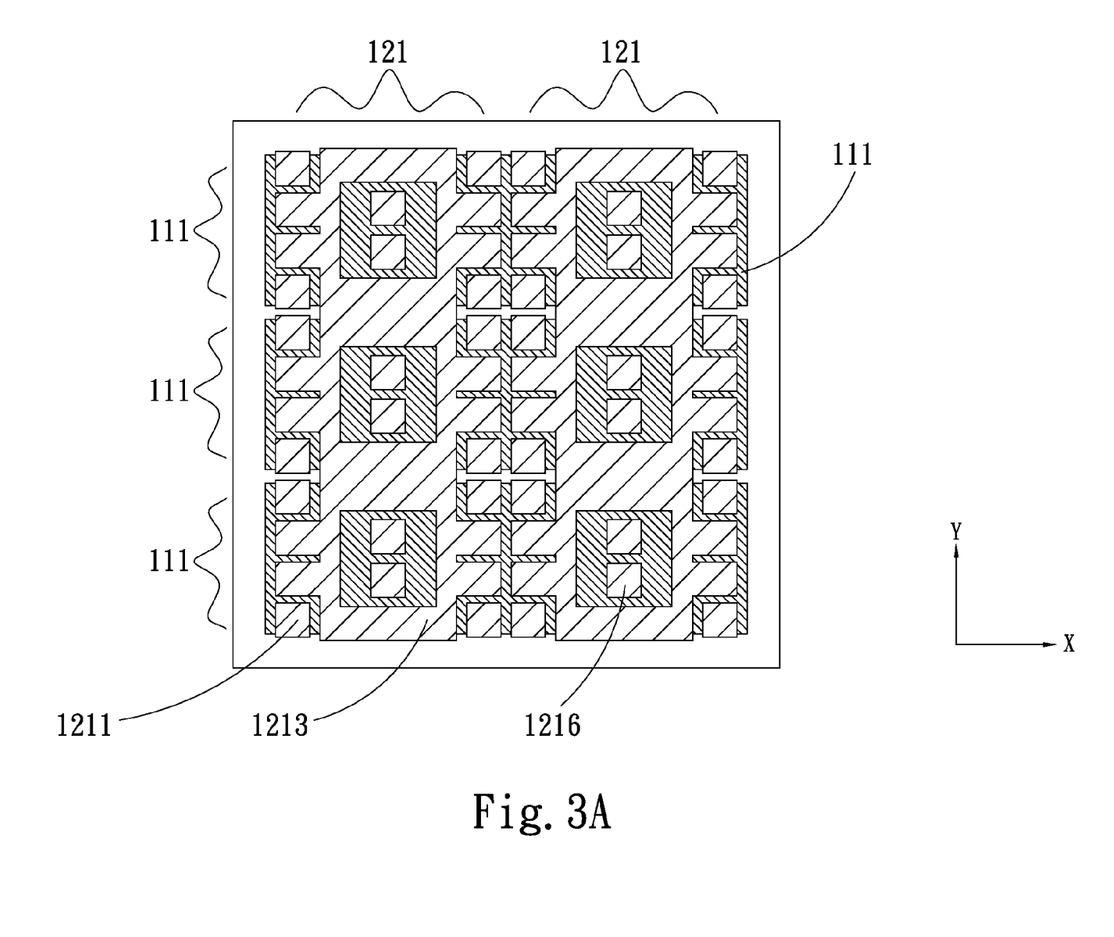
FIG. 3A is an assembled plan view showing a third embodiment of the present invention.
Figure 3B:
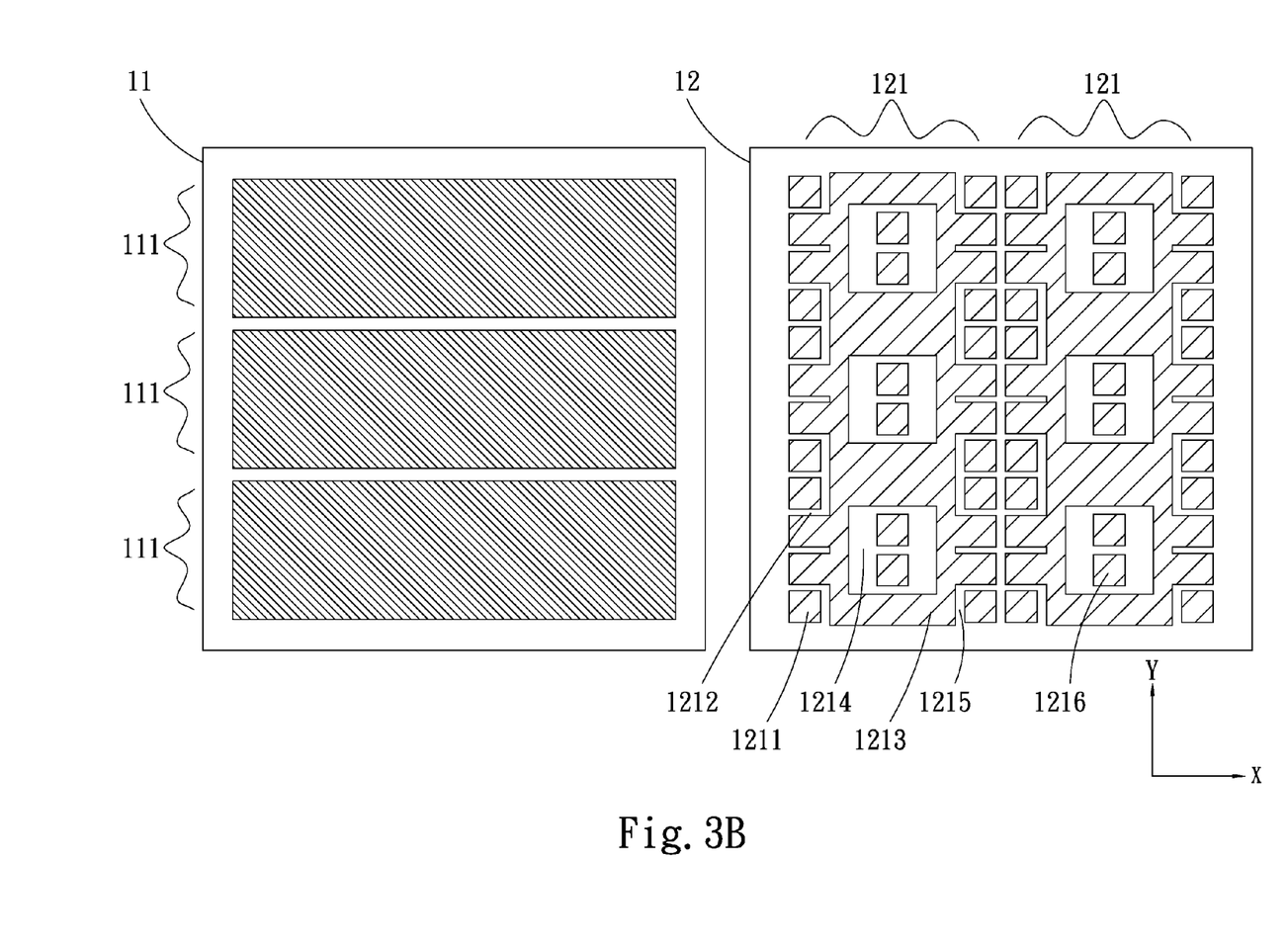
FIG. 3B is an exploded plan view showing the third embodiment of the present invention.

Please refer to FIGS. 3A and 3B. FIG. 3A is an assembled plan view showing a third embodiment of the present invention, and FIG. 3B is an exploded plan view showing the third embodiment of the present invention. As shown in these figures, the structure of the third embodiment is substantially the same as that of the second embodiment, so that the redundant description is omitted for simplicity. The difference between the third embodiment and the second embodiment lies in that the hollow region 1214 of the second sensing electrode region 1213 of the second transparent substrate 12 is provided with at least one third sensing electrode region 1216. In the third embodiment, the hollow region 1214 is provided with two third sensing electrode regions 1216. Thus, by means of the first axial electrode 111 and the second axial electrode 121, the touch pad of the present invention has an increased signal-to-noise ratio and an enhanced anti-jamming capability.

In comparison with prior art, the present invention has the following advantageous features:
(I) increased signal-to-noise ratio;
(II) enhanced anti-jamming capability; and
(III) increased applicability.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A touch pad, including:
   a first transparent substrate, having a plurality of first axial electrodes, at least one hollow channel being formed between adjacent two of the first axial electrodes; and
   a second transparent substrate, provided on one side of the first transparent substrate and having a plurality of second axial electrodes, each of the second axial electrodes having a plurality of first sensing electrode regions and at least one second sensing electrode region, the first sensing electrode regions being provided on both sides of the second sensing electrode region and arranged to extend along a second direction, a central portion of the second sensing electrode region being formed with a hollow region.

2. The touch pad according to claim 1, wherein the first axial electrode is formed by extending along a first direction.

3. The touch pad according to claim 1, wherein at least one first directional channel is formed between adjacent two of the first sensing electrode regions.

4. The touch pad according to claim 1, wherein at least one second directional channel is formed between the first sensing electrode region and the second sensing electrode region.

5. The touch pad according to claim 1, wherein a portion of the first sensing electrode region is connected to the second sensing electrode region.

6. The touch pad according to claim 1, wherein the hollow region is provided with at least one third sensing electrode region.

7. The touch pad according to claim 1, wherein the hollow channel is provided at a position of the first directional channel 8. The touch pad according to claim 1, further including an insulation layer provided between the first transparent substrate and the second transparent substrate to cover the first axial electrode and the second axial electrode.

\* \* \* \* \*